US012576917B2

(12) United States Patent
Fuentes

(10) Patent No.: US 12,576,917 B2
(45) Date of Patent: Mar. 17, 2026

(54) BODY PANEL ASSEMBLY

(71) Applicant: NISSAN NORTH AMERICA, INC.,
Franklin, TN (US)

(72) Inventor: Bobby Fuentes, Novi, MI (US)

(73) Assignee: NISSAN NORTH AMERICA, INC.,
Franklin, TN (US)

( * ) Notice: Subject to any disclaimer, the term of this
patent is extended or adjusted under 35
U.S.C. 154(b) by 528 days.

(21) Appl. No.: 18/072,464

(22) Filed: Nov. 30, 2022

(65) Prior Publication Data

US 2024/0174302 A1    May 30, 2024

(51) Int. Cl.
| | |
|---|---|
| *B62D 25/08* | (2006.01) |
| *B62D 25/02* | (2006.01) |
| *B62D 25/04* | (2006.01) |
| *B62D 25/16* | (2006.01) |
| *B62D 29/04* | (2006.01) |

(52) U.S. Cl.
CPC ............ *B62D 25/08* (2013.01); *B62D 25/02*
(2013.01); *B62D 25/04* (2013.01); *B62D*
*25/165* (2013.01); *B62D 29/04* (2013.01)

(58) Field of Classification Search
CPC .... B62D 25/16; B62D 25/163; B62D 25/165;
B62D 25/08; B62D 25/04
USPC .............. 296/198, 293.06, 1.06, 146.9, 151,
296/203.01, 203.02, 203.03
See application file for complete search history.

(56) References Cited

U.S. PATENT DOCUMENTS

| | | | |
|---|---|---|---|
| 7,083,224 B2 | 8/2006 | Yamamura et al. | |
| 8,371,634 B2 * | 2/2013 | Covarrubias ....... | B60R 13/0861 |
| | | | 296/193.06 |
| 8,608,238 B2 | 12/2013 | Tanaka et al. | |
| 2020/0147921 A1 * | 5/2020 | Horibe ................... | B32B 25/14 |

FOREIGN PATENT DOCUMENTS

| | | | |
|---|---|---|---|
| CN | 204505969 U | * | 7/2015 |
| EP | 1935761 A1 | | 6/2008 |
| FR | 2910432 A1 | | 6/2008 |
| JP | 2001080434 A | * | 3/2001 |
| JP | 3598745 B2 | | 12/2004 |
| JP | 5217487 B2 | | 6/2013 |
| JP | 5801220 B2 | | 10/2015 |
| KR | 2001-0113099 A | | 12/2001 |
| KR | 2008050769 A | * | 6/2008 |
| KR | 20170038948 A | * | 4/2017 |

OTHER PUBLICATIONS

CN204505969 Text (Year: 2015).*
KR2008055769 Text (Year: 2008).*
KR20170038948 Text (Year: 2017).*
JP2001-080434 Text (Year: 2001).*

* cited by examiner

*Primary Examiner* — Dennis H Pedder
(74) *Attorney, Agent, or Firm* — Spencer Fane, LLP

(57) ABSTRACT

A body panel includes a main body and a flexible material
portion. The main body has an overall elongated shape that
defines a first lengthwise edge, a second lengthwise edge and
a bottom edge. The flexible material that extends along a
portion of the first lengthwise edge, at least a portion of the
second lengthwise edge and along the bottom edge.

20 Claims, 9 Drawing Sheets

BODY PANEL ASSEMBLY

BACKGROUND

Technical Field

The present disclosure generally relates to a body panel assembly. More specifically, the present disclosure relates to body panel installed to an area of a vehicle between an A-pillar structure and an adjacent fender thereby covering and concealing the area and providing a quieter ride.

Background Information

Modern vehicles are typically manufactured with a variety of components and body panels that are made of differing materials, each differing material having its own thermal expansion and thermal contraction properties.

SUMMARY

One object of the present disclosure is to provide a body panel with a cushion-like or flexible portion that compresses and expands in response to the remainder of the body panel and adjacent body parts undergoing thermal expansion or thermal contraction without body panel warpage or damage.

In view of the state of the known technology, one aspect of the present disclosure is to provide a body panel that includes a main body and a flexible material portion. The main body has an overall elongated shape that defines a first lengthwise edge, a second lengthwise edge and a bottom edge. The flexible material portion that extends along a portion of the first lengthwise edge, at least a portion of the second lengthwise edge and along the bottom edge.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
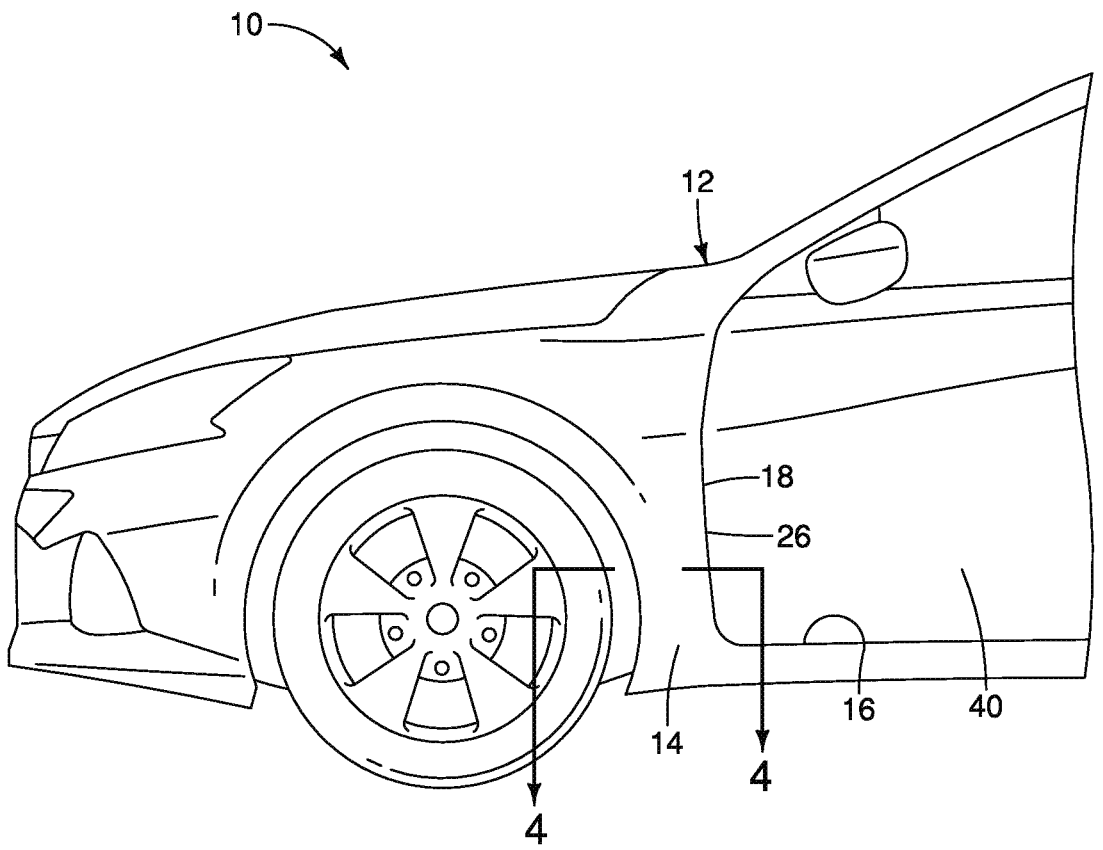
FIG. 1 is a side view of a front half of a vehicle showing a fender panel and a front door of the vehicle in accordance with an exemplary embodiment.
Figure 2:
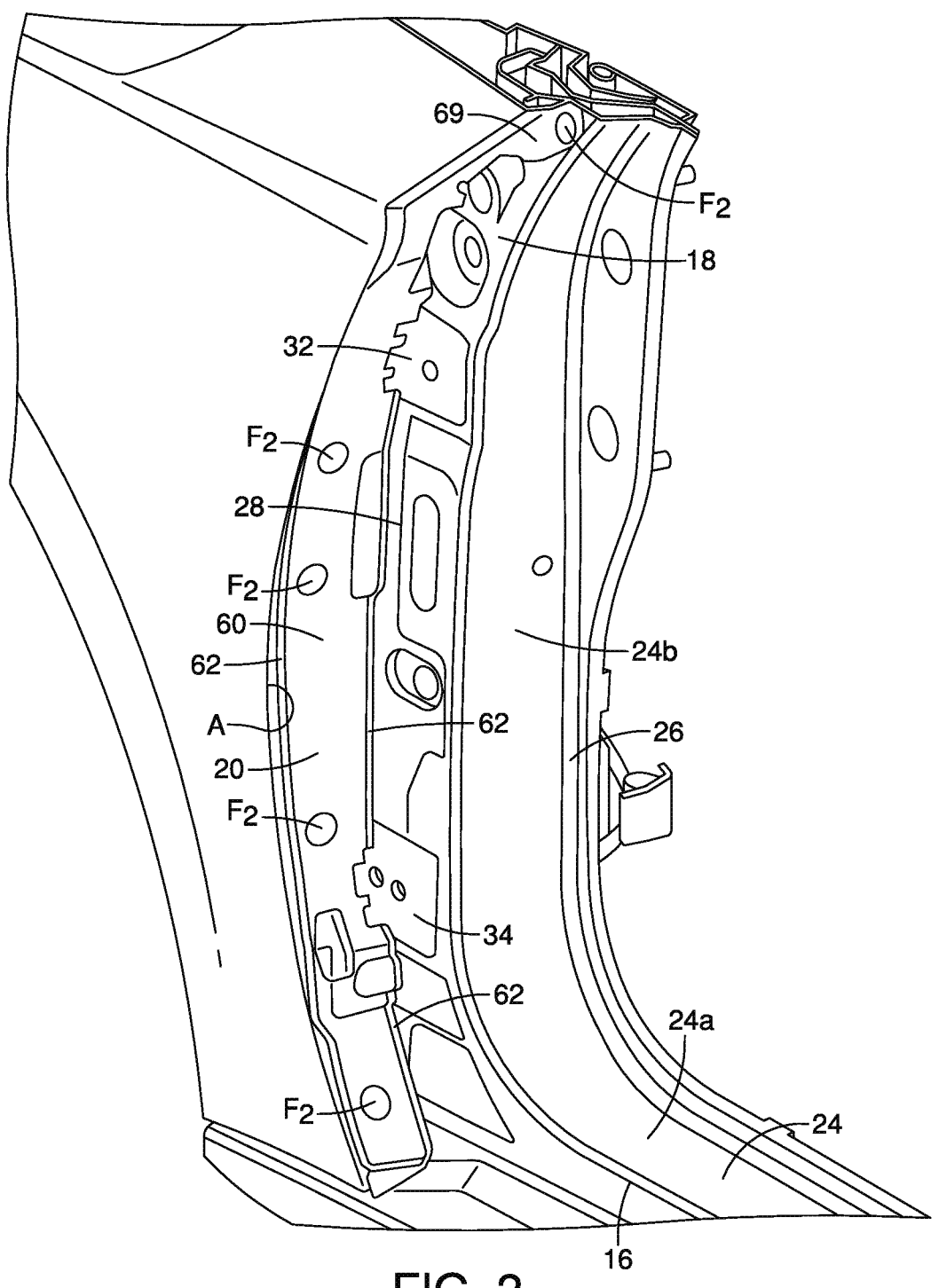
FIG. 2 is perspective view of a portion of the vehicle with the front door removed showing the fender panel, an A-pillar structure and a body panel installed between an inboard surface of the fender panel and an outboard surface of the A-pillar structure in accordance with the exemplary embodiment.
Figures 3, 4:
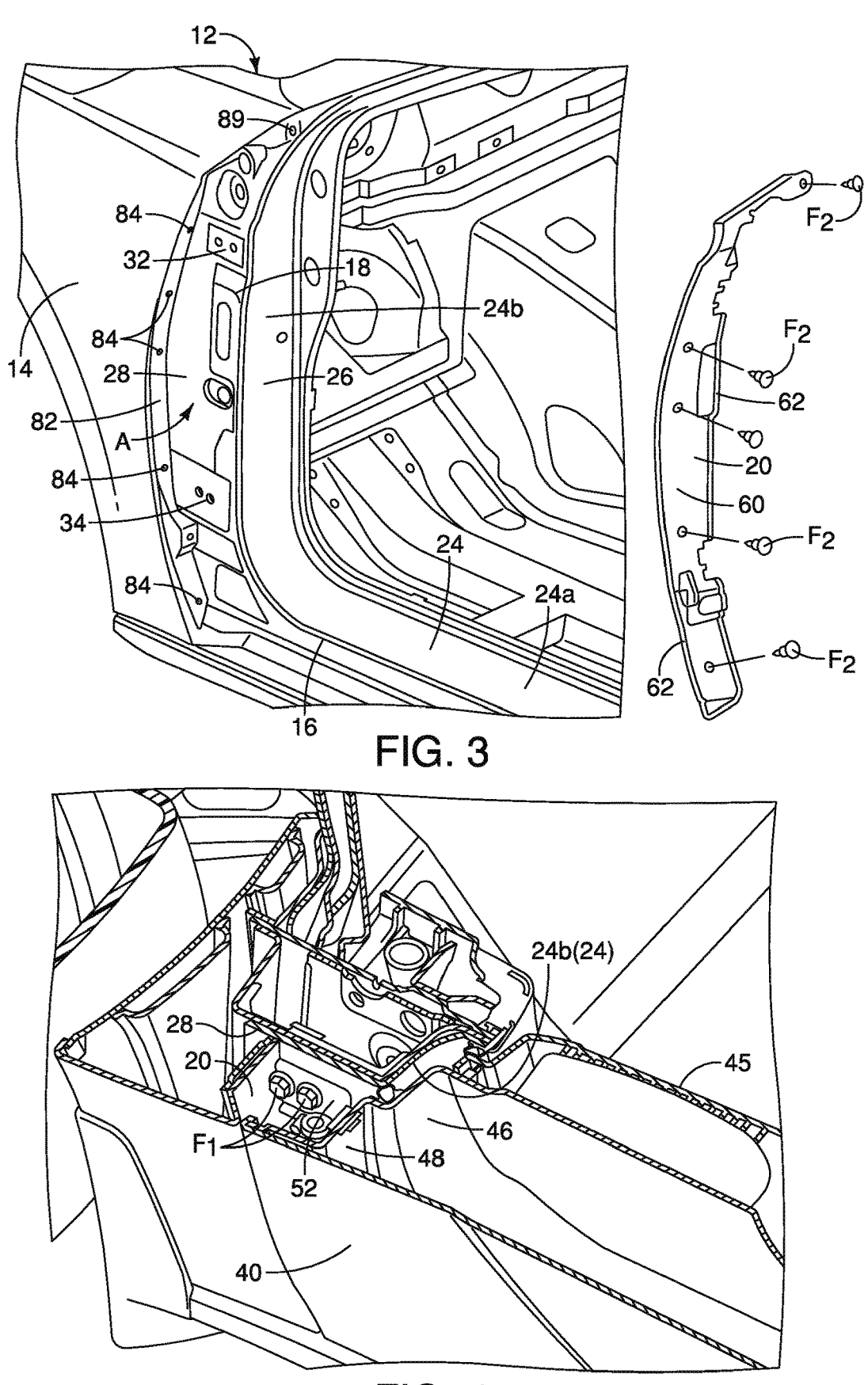
FIG. 3 is an exploded perspective view similar to FIG. 2 showing an area between the fender panel and the A-pillar structure that is exposed with the body panel removed from the fender panel and the A-pillar structure in accordance with the exemplary embodiment.
FIG. 4 is a cross-sectional perspective view of the vehicle taken along the lines 4-4 in FIG. 1, showing details of the body panel, the fender panel and the A-pillar structure in accordance with the exemplary embodiment.

Referring initially to FIG. 1, a vehicle 10 is illustrated in accordance with a first embodiment. As shown in FIGS. 2 and 3, the vehicle 10 includes a vehicle body structure 12 that includes a first vehicle body panel 14, a sill structure 16, an A-pillar structure 18 and a body panel 20 that covers and conceals an area A between the first vehicle body panel 14 and the A-pillar structure 18.

The vehicle body panel 14 is a fender that attaches to other elements of the vehicle body structure 12 in a conventional manner. Hereinafter, the vehicle body panel 14 is referred to as the fender panel 14. The fender panel 14 is preferably made of metallic material.

Figure 11:
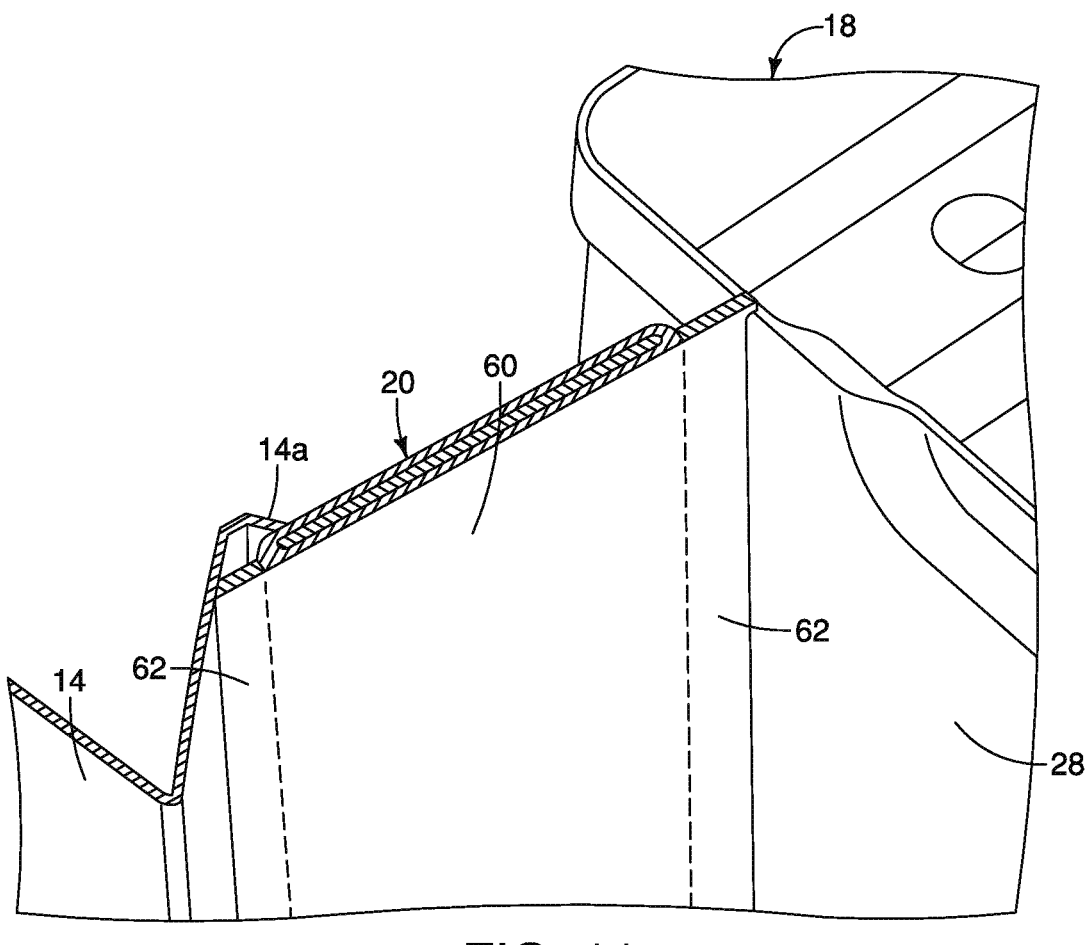
FIG. 11 is a cross-sectional view of the body panel taken along the line 11-11 in FIG. 9 in accordance with the exemplary embodiment.
Figure 12:
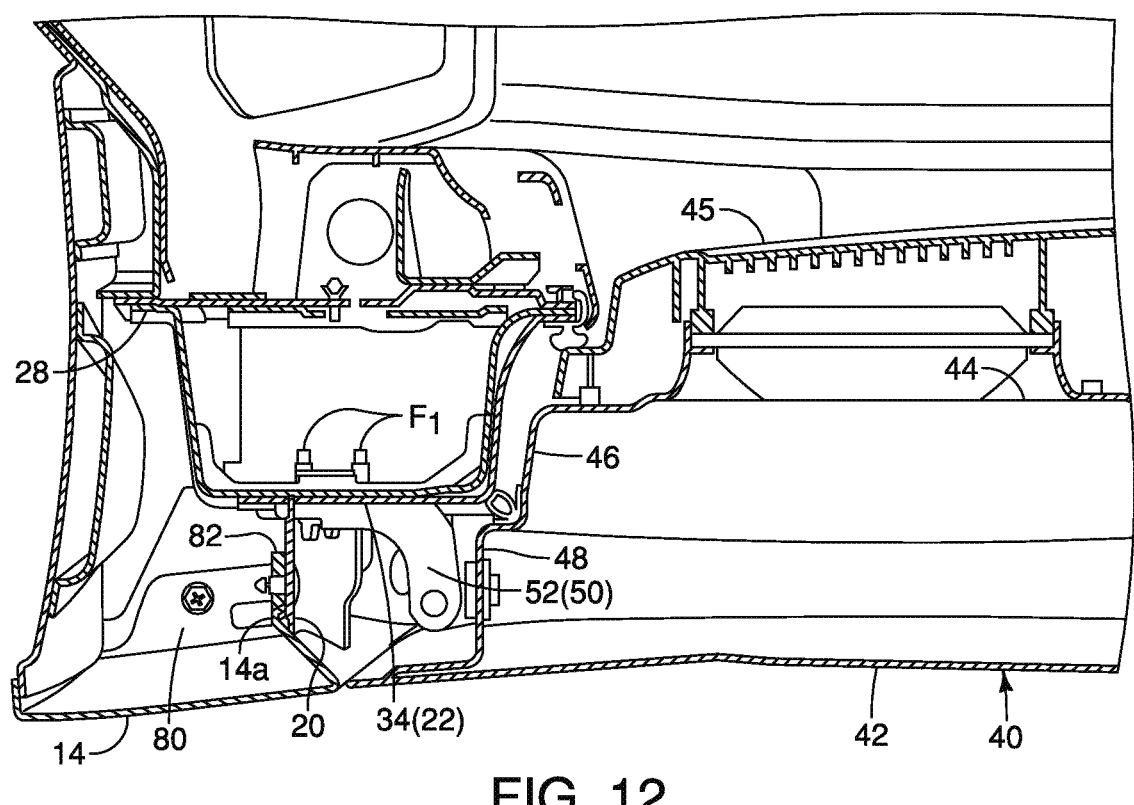
FIG. 12 is a cross-sectional view of the A-pillar structure, the front door, the fender panel and the body panel looking downward in accordance with the exemplary embodiment.
Figure 13:
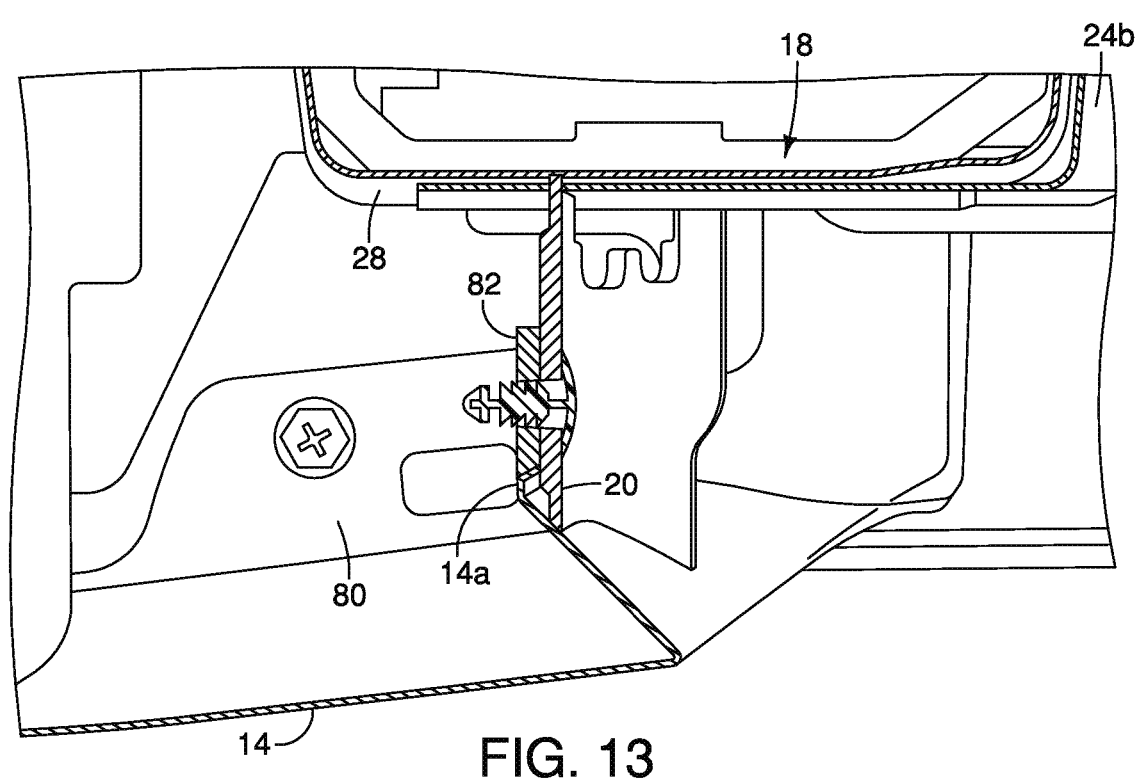
FIG. 13 is another cross-sectional view of the A-pillar structure, the fender panel and the body panel looking downward in accordance with the exemplary embodiment.

As shown in FIGS. 11, 12 and 13, the fender panel 14 includes a flange or bracket portion 14a that extends in an inboard direction from the main portion of the fender panel 14. As is described in greater detail below, an outboard edge of the body panel 20 contacts the bracket portion 14a with the body panel 20 installed to the vehicle body structure 12.

The sill structure 16 and A-pillar structure 18 are conventional structures that include common elements. For example, as shown in FIG. 3, the sill structure 16 includes a panel 24 that extends horizontally and curves upward thereby also defining a portion of the A-pillar structure 18. Consequently, the panel 24 has at least a sill portion 24a and an A-pillar portion 24b that partially define a front door opening 26.

The A-pillar structure 16 is defined by a plurality of structural elements including the panel 24 and an outboard panel 28. The outboard panel 28 is a structural member that extends forward from the A-pillar portion 24a of the panel 24. The outboard panel 28 further defines an upper door hinge support area 32 and a lower door hinge support area 34. The area A is a partially hollow area between an outboard surface of the outboard panel 28 and an inboard surface of the fender panel 14.

As shown in FIGS. 1, 4 and 12, the vehicle 10 includes a front door 40. The front door 40 includes at least an outer panel 42, an inner panel 44 and a trim panel 45. The inner panel 44 includes an A-pillar facing section 46 and a body panel facing section 48. More specifically, with the front door 40 in a closed orientation, the A-pillar facing section 46 faces and a body panel facing section 48.

The body panel facing section 48 of the inner panel 44 of the front door 40 includes an upper hinge 50 and a lower hinge 52 that are fixedly attached thereto in a conventional manner. The upper hinge 50 is also fixedly attached via mechanical fasteners $F_1$ to the upper door hinge support area 32 of the outboard panel 28 of the A-pillar structure 18. Similarly, the lower hinge 52 is also fixedly attached via mechanical fasteners $F_1$ to the lower door hinge support area 34 of the outboard panel 28 of the A-pillar structure 18.

Figure 5:
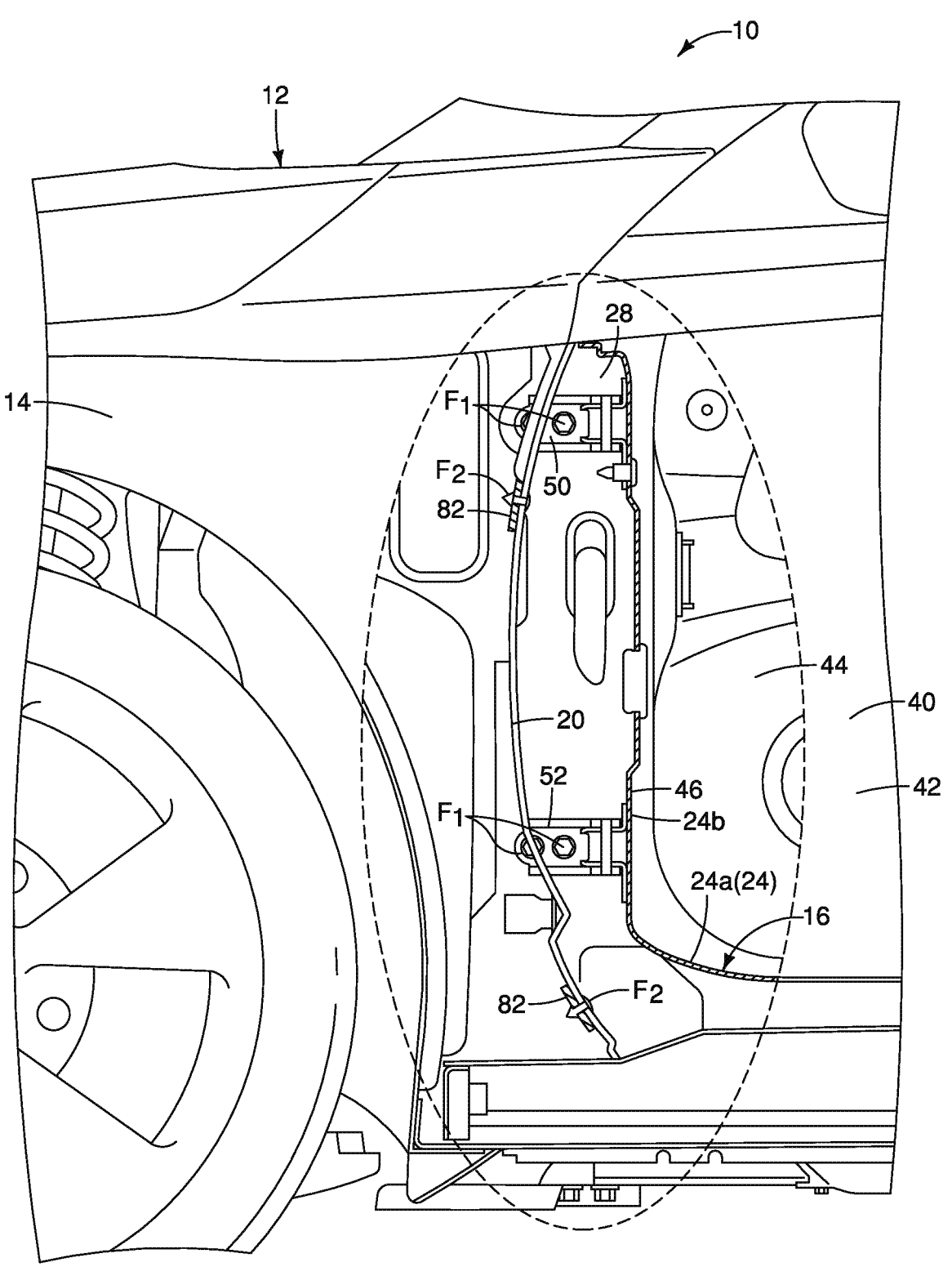
FIG. 5 is a side cut-away view of the vehicle showing details of the door hinges of the front door, the body panel and the A-pillar structure in accordance with the exemplary embodiment.
Figures 6, 7:
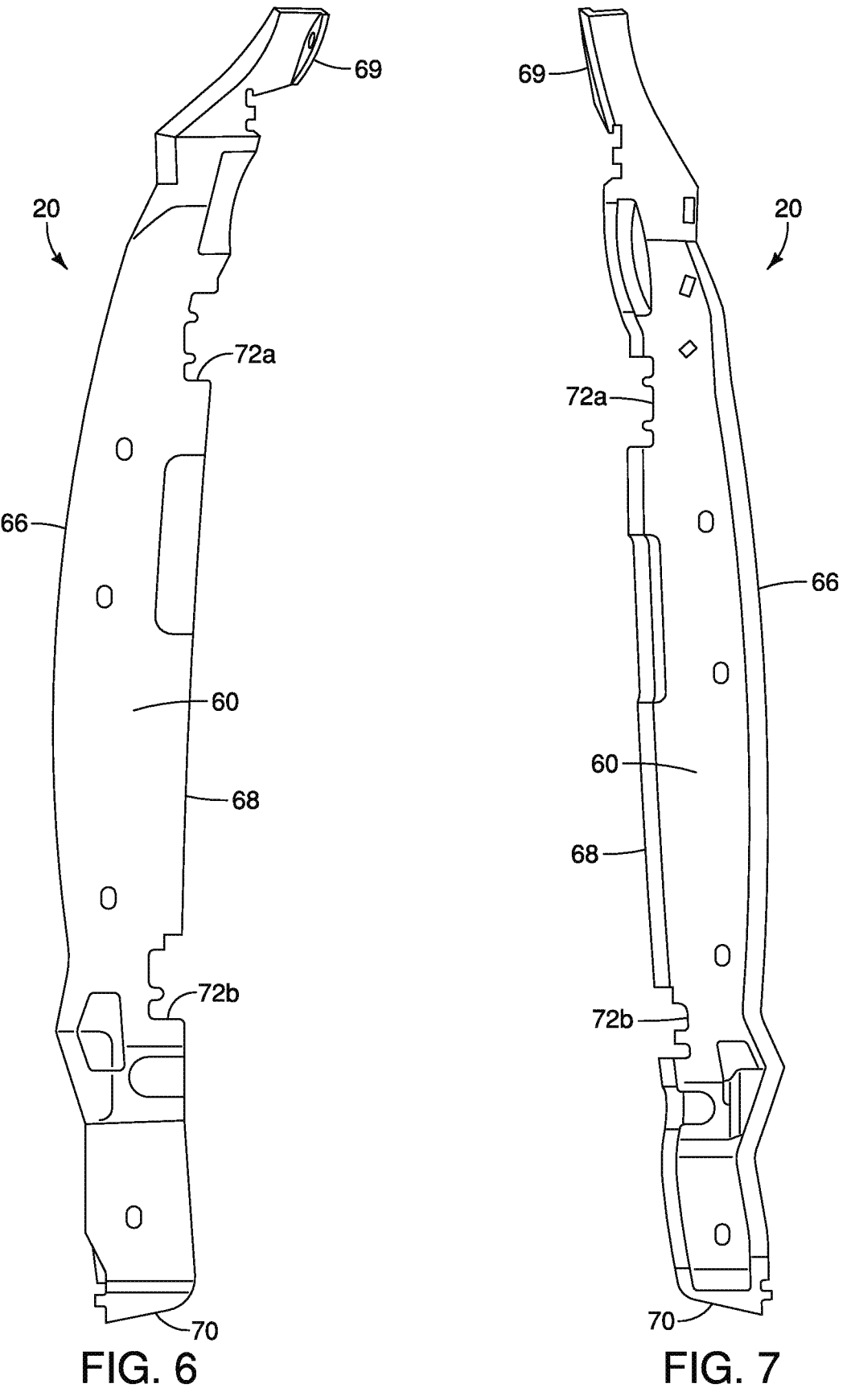
FIG. 6 is a rear view of the body panel removed from the vehicle in accordance with the exemplary embodiment.
FIG. 7 is a front view of a main body of the body panel removed from the vehicle in accordance with the exemplary embodiment.
Figures 8, 9:
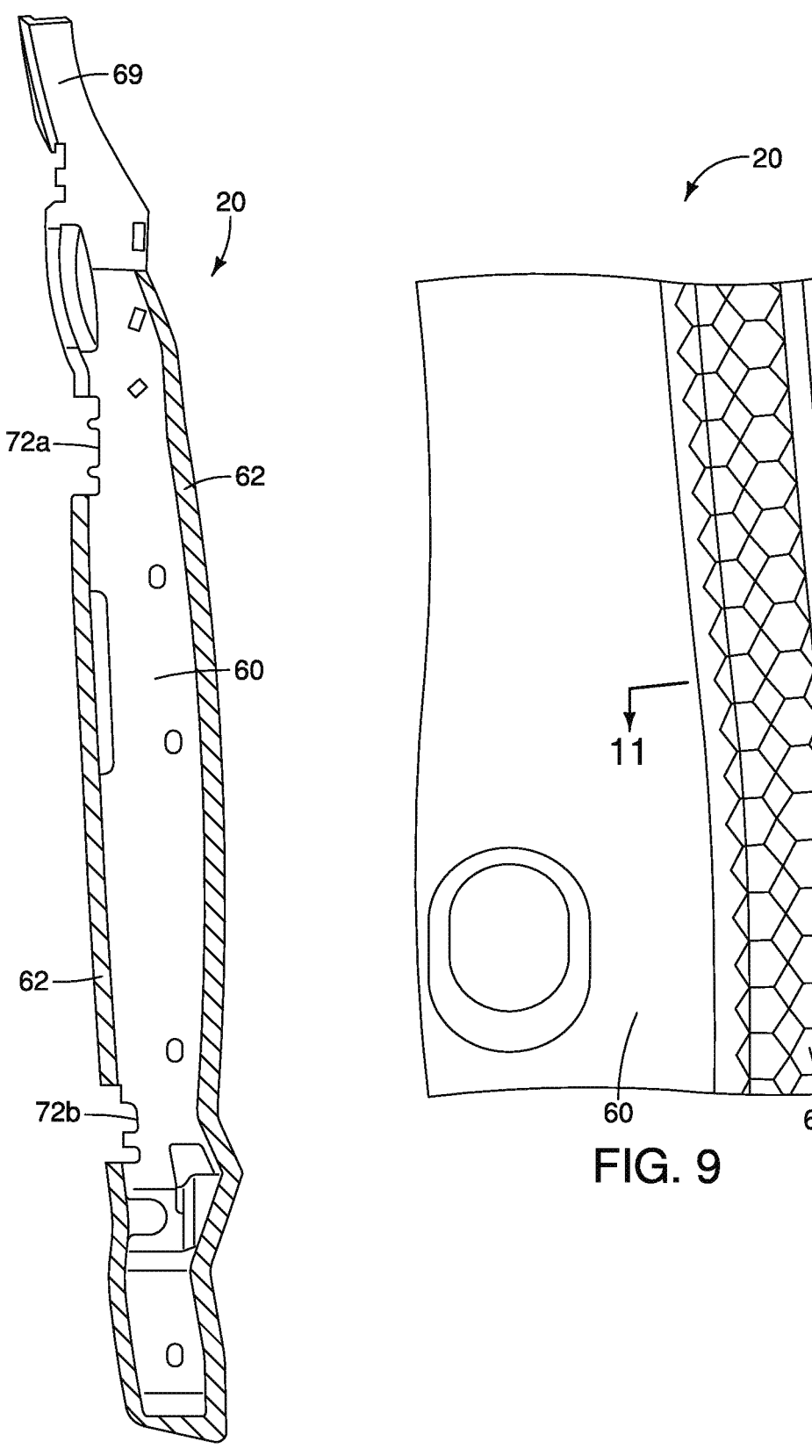
FIG. 8 is another front view of the main body of the body panel similar to FIG. 7 showing a cushioning or flexible material portion extending along a first, second and bottom edges of the main body of the body panel in accordance with the exemplary embodiment.
FIG. 9 is an enlarges section of FIG. 8 showing details of the flexible material portion, including a hollow interior that includes lattice or honeycomb-like structures that provide the flexible material portion with compressibility and resilience in accordance with the exemplary embodiment.

As shown in FIGS. 2, 3 and 6-11, the body panel 20 includes a main body 60 and a flexible material portion 62. The main body 60 has an overall elongated shape (vertically) that has a curved contour, as viewed from the side in FIG. 5. The main body 60 defines a first lengthwise edge 66, a second lengthwise edge 68 and a bottom edge 70. The second lengthwise edge 68 includes a first recessed area 72a and a second recessed area 72b. The first recessed area 72a is shaped and dimensioned to receive the upper hinge 50 and the second recessed area 72b is shaped and dimensioned to receive the lower hinge 52 with the vehicle 10 fully assembled.

The flexible material portion 62 is made of a flexible, compressible and resilient material that expands back to its original dimensions after being compressed. The flexible material portion 62 extends along at a portion of the first lengthwise edge 66, at least a portion of the second lengthwise edge 68 and along the bottom edge 70. Along the second lengthwise edge 68, the flexible material portion 62 has gaps in it corresponding to the first and second recessed areas 72a and 72b. The body panel 20 is installed to the vehicle body structure 12 of the vehicle 10 such that flexible material portion 62 of at least one of the first lengthwise edge 66, the second lengthwise edge 68 and the bottom edge 70 contacts the fender panel 14 (the first vehicle body panel) and the outboard panel 28 of the A-pillar structure 18 with the body panel 20 installed to cover and conceal the area A. More specifically, the flexible material portion 62 along the first lengthwise edge 66 contacts an inboard surface of the fender panel 14, as shown in FIG. 11. The flexible material portion 62 along the second lengthwise edge 68 contacts the outboard panel 28 of the A-pillar structure 18, as shown in FIGS. 2, 4 and 10-14. The flexible material portion 62 along the bottom edge 70 contacts a sill extension 80 that can be a panel that extends from the sill structure 16 and/or a lower flange portion of the fender panel 14.

In response to thermal expansion of the fender panel 14, the A-pillar structure 18, the sill structure 16 (sill extension 80) and/or the main body 60 of the body panel 20, the flexible material portion 62 at the edges and bottom of the main body 60 are compressed and upon relaxation of the thermal forces that compress the flexible material portion 62, the resiliency of the flexible material portion 62 enables expansion of the flexible material portion 62 to its installed dimensions.

In other words, the flexible material portion 62 (also referred to as a cushioning material) is arranged and located to flex and/or compress in response to thermal expansion of the main body 60 and surrounding structures when the body panel 20 is installed to the vehicle 10.

The flexible material portion 62 is molded to the main body 60 such that the main body 60 and the flexible material portion 62 are unitarily molded together as a single element. For example, the main body 60 is formed from a first polymer material and the flexible material portion 62 is formed from a second polymer material. The first polymer material includes polypropylene (PP) and the second polymer material includes ethylene propylene diene monomer rubber (EPDM). As is well known, polypropylene (PP) is more rigid when made into a panel than ethylene propylene diene monomer rubber (EPDM). Hence, the main body 60 may have some flexibility, but is preferably rigid. The flexible material portion 62 is preferably compressible and resilient.

Figure 10:
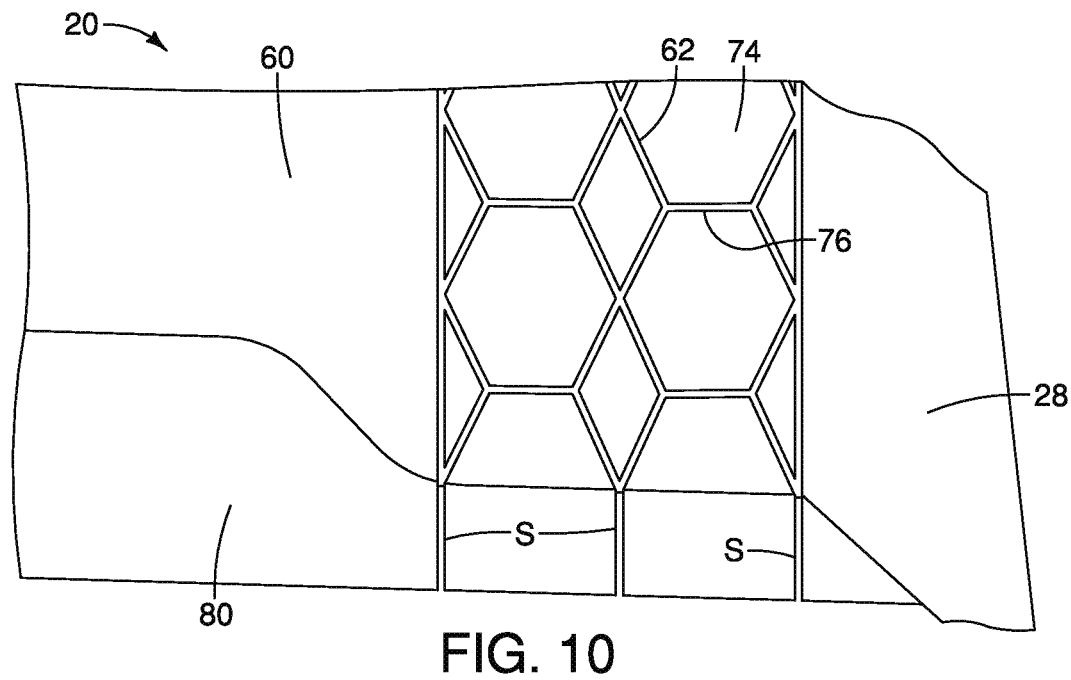
FIG. 10 is a further enlarged view of the flexible material portion showing the honeycomb-like lattice structures within the hollow interior of the flexible material portion of the body panel in accordance with the exemplary embodiment.

The flexible material portion 62 has a partially hollow interior 74, as shown in FIG. 10. The flexible material portion 62 is shaped to form a lattice 76 that includes honey-comb-like shapes within the partially hollow interior 74.

As is shown in FIGS. 2, 3 and 5-7, the main body 60 defines an overall length that is at least 8 times an overall width of the main panel 60. This ratio of 8:1 can be varied depending upon the design of the vehicle 10. The ratio can be anywhere between 4:1 and 12:1.

The body panel 20 attaches to the vehicle body structure 12 via a plurality of fasteners $F_2$. As shown in FIG. 3, the outboard panel 28 includes a flange 82 that includes openings 84. When the body panel 20 is placed up against the projection 82, the openings 84 align with corresponding openings that receive the fasteners $F_2$. One of the openings 84 is formed at an upper end 69 of the main body 60 of the body panel 20. One of the fasteners $F_2$ is received in the openings 84 of the upper end 69 and then extends through a corresponding opening at an upper end of the fender panel 14.

Figure 14:
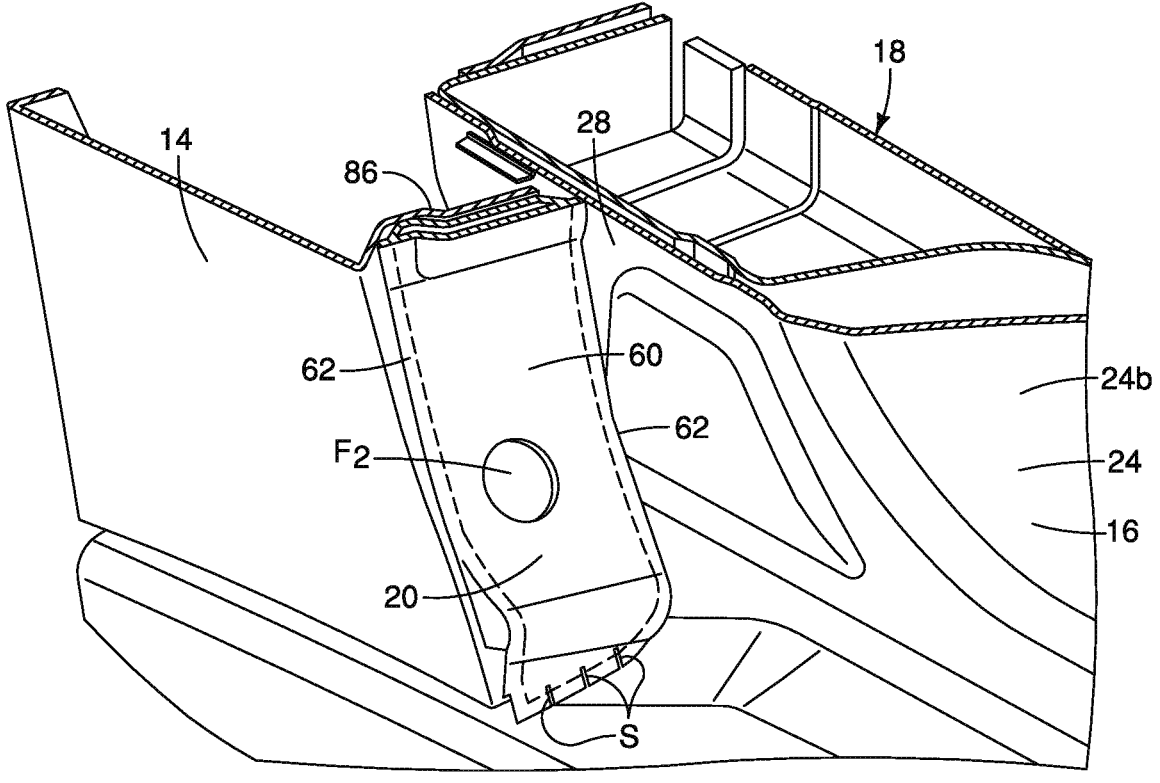
FIG. 14 is a cross-sectional perspective view of a lower area of the A-pillar structure, the fender panel and the body panel in accordance with the exemplary embodiment.

As shown in FIG. 14, the lower end 86 of the bracket portion 14a of the fender panel is wider that the upper area of the bracket portion 14a (see FIGS. 11-13) and receives one of the fasteners $F_2$.

In the depicted embodiment, the flange 82 is formed as a part of the outboard panel 28 of the A-pillar structure 18. Alternatively, the flange 82 can be part of the fender panel 14.

Along the bottom of the main body 60 of the body panel 20, slits S can be formed along the in the main body 60 as shown in FIG. 10. These slits S provide another form of relief from compressive forces associated with thermal expansion and contraction of the vehicle body structure. Specifically, the slits S allow the main body 60 to shift and move relative to the vehicle body structure 18 in response to thermal expansion and contraction of the elements that make up the vehicle 10 and the body panel 20. In FIG. 10, the bottom edge 70 is shown with slits S. However, it should be understood from the drawings and the description herein that the first lengthwise edge 66 and the second lengthwise edge 68 of the body panel 20 can also be provided with slits S.

During the change in seasons, temperatures rise and fall. The metal that is used to make many elements of the vehicle body structure 12, such as the fender panel 14 and the A-pillar structure 18 expand and contract as a result of the changes in temperature. Since the body panel 20 is made of polymers such as PP and EPDM, the body panel 20 expands and contracts in response to thermal changes differently than metal panels. In some temperature conditions, the body panel 20 will be compressed causing a reduction in the dimensions of the flexible material portions 62. In other temperature conditions, the compressive forces reducing the dimensions of the flexible material portions 62 is relieved allowing the flexible material portion 62 to expand to its pre-compression dimensions between the A-pillar 18 and the fender panel 14.

The various elements and features of the vehicle body structure 12, other than the body panel 20, are conventional components that are well known in the art. Since such elements and features are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the body panel assembly. Accordingly, these terms, as utilized to describe the present invention should be interpreted relative to a vehicle equipped with the body panel assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

6

What is claimed is:

1. A body panel comprising:
a main body having an overall elongated shape defining a first lengthwise edge, a second lengthwise edge and a bottom edge; and
a flexible material portion including a first portion that extends along at least a portion of the first lengthwise edge and contacts a fender panel, a second portion that extends along at least a portion of the second lengthwise edge and contacts a pillar structure, and a bottom portion that extends along at least a portion of the bottom edge, the contact with the fender panel and the pillar structure creating a first gap between the main body, the fender panel and the pillar structure,
the main body contacting the fender panel at a first location and the flexible material portion contacting the fender panel at a second location with a second gap between the main body and the fender panel between the first location and the second location.

2. The body panel according to claim 1, wherein the flexible material is molded to the main body such that the main body and the flexible material are unitarily molded together as a single element.

3. The body panel according to claim 1, wherein the flexible material has a partially hollow interior.

4. The body panel according to claim 3, wherein the flexible material includes a lattice honey-comb-like shape within the partially hollow interior.

5. The body panel according to claim 1, wherein the flexible material includes a lattice like honey-comb shape.

6. The body panel according to claim 1, wherein the flexible material includes a compressible and resilient material.

7. The body panel according to claim 1, wherein the main body is formed from a first polymer material and the flexible material is formed from a second polymer material.

8. The body panel according to claim 7, wherein the first polymer material includes polypropylene and the second polymer material includes ethylene propylene diene monomer rubber.

9. The body panel according to claim 1, wherein the main body defines an overall length that is at least 8 times an overall width of the main body.

10. The body panel according to claim 1, wherein the flexible material is arranged and located to flex in response to thermal expansion of the main body and surrounding structures when the body panel is installed to a vehicle.

11. A body panel assembly comprising:
a fender panel made of a metallic material; and
a body panel having a main body and a flexible material, the main body having an overall elongated shape that defines a first lengthwise edge, a second lengthwise edge and a bottom edge, the flexible material including a first portion that extends along at least a portion of the first lengthwise edge and contacts the fender panel, a second portion that extends along at least a portion of the second lengthwise edge and contacts a pillar structure, and a bottom portion that extends along at least a portion of the bottom edge, the contact with the fender panel and the pillar structure creating a first gap between the main body, the fender panel and the pillar structure, the body panel being installed to a vehicle such that the first lengthwise edge contacts the fender panel such that in response to thermal expansion of the fender panel and/or the main body of the body panel, the flexible material is compressed, the main body contacting the fender panel at a first location and the flexible material contacting the fender panel at a second location with a second gap between the main body and the fender panel between the first location and the second location.

12. The body panel assembly according to claim 11, wherein the flexible material is molded to the main body such that the main body and the flexible material are unitarily molded together as a single element.

13. The body panel assembly according to claim 11, wherein the flexible material has a partially hollow interior.

14. The body panel assembly according to claim 13, wherein the flexible material includes a lattice honey-comb-like shape within the partially hollow interior.

15. The body panel assembly according to claim 11, wherein the flexible material includes a lattice like honey-comb shape.

16. The body panel assembly according to claim 11, wherein the flexible material includes a compressible and resilient material.

17. The body panel assembly according to claim 11, wherein the main body is formed from a first polymer material and the flexible material is formed from a second polymer material.

18. The body panel assembly according to claim 17, wherein the first polymer material includes polypropylene and the second polymer material includes ethylene propylene diene monomer rubber.

19. The body panel assembly according to claim 11, wherein the main body defines an overall length that is at least 8 times an overall width of the main body.

20. The body panel assembly according to claim 11, wherein the flexible material is arranged and located to flex in response to thermal expansion of the main body and surrounding structures when the body panel is installed to a vehicle.

* * * * *